J. DENSMORE.
PLOW-JOINTER.
No. 190,672.  Patented May 15, 1877.
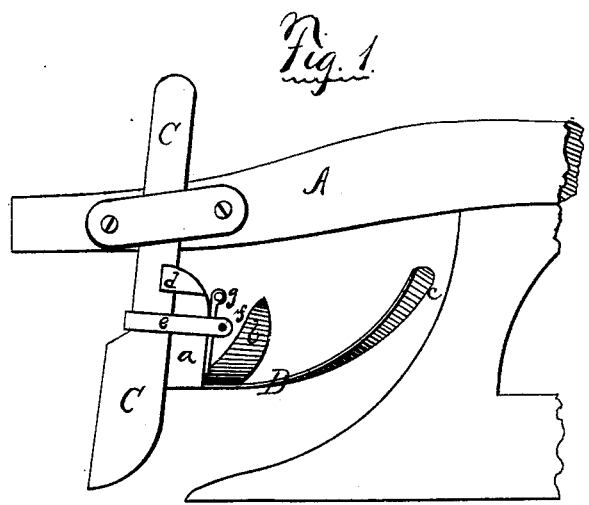
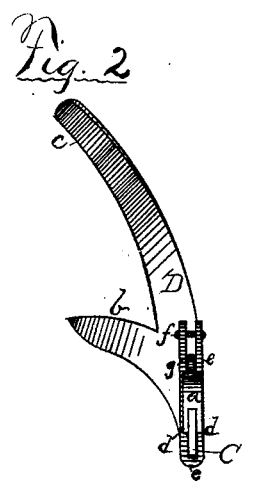
Witnesses
J. R. Drake.
N. H. Parsons.
Jay Densmore
Inventor,
by
J. R. Drake,
atty.

UNITED STATES PATENT OFFICE.

JAY DENSMORE, OF TONAWANDA, NEW YORK.

IMPROVEMENT IN PLOW-JOINTERS.

Specification forming part of Letters Patent No. 190,672, dated May 15, 1877; application filed March 7, 1877.

*To all whom it may concern:*

Be it known that I, JAY DENSMORE, of Tonawanda, in the county of Erie and State of New York, have made certain Improvements in Plow-Jointers, of which the following is a specification:

The object of this invention is to furnish a device by which the upper land-side corner of a furrow that is being turned over by a plow will be cut completely loose from the furrow, and such loose corner be raised out of its original bed and deposited upon the top of the furrow, so that when the furrow is being turned over by the plow the loose corner will fall into the open space beside the said furrow and be covered up by it, so that the surface of the plowed land will be left smooth and even, and, at the same time, free from the protruding edges of the turf, and thereby be more easily worked.

In the drawings, Figure 1 is a side elevation of a portion of a plow and the colter, with my jointer attached. Fig. 2 is a plan of the jointer and its attachments.

A represents the beam of a plow; C, the colter, and D the jointer. This latter is composed of the upright piece $a$, the cutting-shear $b$, and the elevating-bar $c$. The upper end of the piece $a$ is provided with lips $d\ d$, which project one on each side of the colter C; and the band $e$ passes around both the colter and the piece $a$, and is held in its place by the bolt $f$ and the key $g$. The cutting-shear $b$ is set back at an angle to the line of the draft of the piece $a$, and the colter, its inner end being horizontal and its outer end curved upward, as shown in Fig. 1, so that it will project through the surface of the ground in which it is cutting. The elevating-bar $c$ is longer, and set so as to constitute an incline for raising up the loose corner of the furrow upon the top of the other furrow, when it is free to fall into the open space while the furrow is being turned over by the plow, where it is entirely out of the way and will be covered up.

The means of attaching the jointer to the colter by the lips $d\ d$, the band $e$, the bolt $f$, and the key $g$, permit the jointer to be raised and lowered upon the colter and firmly secured at any desired point, thereby making it adjustable.

This jointer is easily adjusted, is strong, light, durable, and adds but little strain to the plow or team, and leaves the ground in a compact and even condition. It is of simple construction, and can be attached to any colter or plow.

I claim—

1. In combination with the colter or upright piece C, the jointer D, constructed with the upright post $a$, the curved cutting-shear $b$, and the long elevating-bar $c$, substantially as hereinbefore specified.

2. In combination with the colter C and jointer D $a\ b\ c$, the lips $d\ d$, the band $e$, bolt $f$, and key $g$, for the purpose of attaching and adjusting the jointer, substantially as specified.

In witness whereof I have hereunto signed my name in the presence of two subscribing witnesses.

JAY DENSMORE.

Witnesses:
J. R. DRAKE,
T. H. PARSONS.